Sept. 16, 1947.   L. G. HILKEMEIER   2,427,499
WATER SUPPLY SYSTEM FOR CONCRETE MIXERS
Filed Dec. 20, 1943

Inventor
LOUIS G. HILKEMEIER,
By B. B. Collings.
Attorney

Patented Sept. 16, 1947

2,427,499

UNITED STATES PATENT OFFICE 2,427,499

WATER SUPPLY SYSTEM FOR CONCRETE MIXERS

Louis G. Hilkemeier, Milwaukee, Wis., assignor to Chain Belt Company, Milwaukee, Wis., a corporation of Wisconsin Application December 20, 1943, Serial No. 515,037

1 Claim. (Cl. 222—128)

The invention relates to water supply systems for concrete mixers, and has for its principal object to provide an improved arrangement of water reservoir or tank, pressure pump, piping and valves for furnishing water in measured quantities and under pressure to the mixing drum or chamber of a concrete mixer.

A further object of the invention is to provide a water supply system of the character described adapted, through a single readily operable three-position control lever, to enable water to be pumped from any available source of supply to a mixer-carried tank, and then to be pumped therefrom in measured quantities to the mixing chamber, all without by-passing or short circuiting of the water between the source of supply and the mixing chamber which would destroy the accuracy of the measurements.

For purposes of disclosure one form of the invention is illustrated, somewhat diagrammatically, in the accompanying drawing forming a part of this specification, in which like reference characters designate like parts in all the views, and in which.

Figure 1:
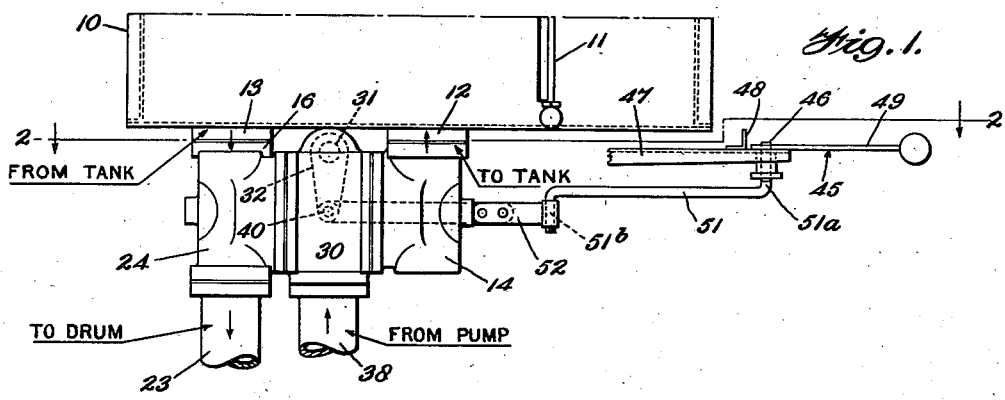
Figure 1 is a side elevational view of a portion of a conventional water tank or reservoir such as is usually carried by present day concrete mixing machines, together with valves and actuating mechanism therefor, arranged in accordance with the invention.

In the said drawing, 10 indicates the mixer-carried tank or reservoir, provided with any suitable means for indicating or measuring the quantities of water withdrawn therefrom, here shown as a gauge glass 11. The tank is provided with an inlet port connection 12 and an outlet port connection 13, to the former of which is connected a valve chamber 14 enclosing a spring-seated valve 15 for controlling flow of water to the tank, while to the latter of said tank connections there is connected a valve chamber 16 housing a spring-seated valve 17 for controlling discharge of water from the tank. A pipe or conduit 20 is provided, for conducting water from any available source of supply to a valve chamber 21 housing a spring-seated valve 22; and a pipe 23 leads to the mixing drum or chamber (not shown) from a valve chamber 24 enclosing a spring-seated valve 25.

The valve bodies 16 and 21 may be disposed to either side of and connected to an intermediate housing 26, whereby their respective valves 17 and 22 may be alternatively opened against the action of their biasing springs by an oscillating lever 27 within said housing 26, which lever is carried by a valve stem 28, provided with an actuating arm 29. In like manner, the valve bodies 14 and 24 may be alined to either side of an intermediate housing 30 which journals a valve stem 31 provided with an actuating arm 32 and carrying an operating lever 33 by means of which the valves 15 and 25 may be alternatively unseated against the action of their respective springs. The housing 26 is provided with a port 35 which is connected by a pipe or conduit 36 with the intake side of a centrifugal or other suitable pump 37, the discharge side of which is connected by a pipe 38 to the port 39 of the intermediate housing 30. The valve stems 28 and 31 are connected for operation in unison, as for example by a pin 40 interconnecting the actuating arms 29 and 32.

A control lever 45, here shown as of bell-crank form, is pivotally mounted as at 46 on a member 47 of the mixer framework, which member also carries a fixed stop 48 positioned to be engaged by the longer leg 49 of the lever 45, in each of the operating positions of the latter. The shorter leg 50 of the control lever 45 is connected by links 51 and 52 to the pin 40 of the valve actuating arms.

Figure 2:
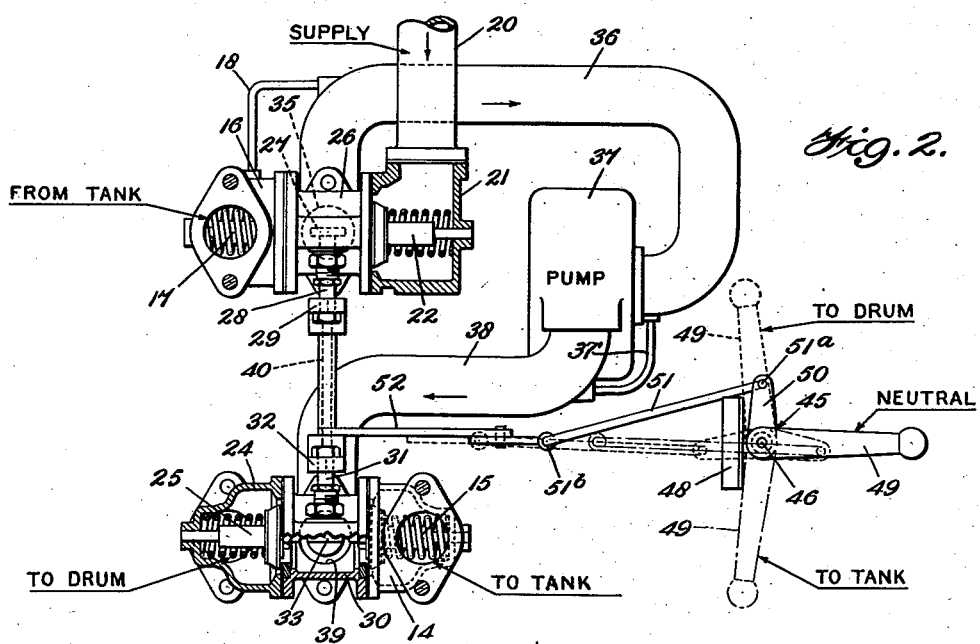
Fig. 2 is a sectional plan view, in general on the plane indicated by the line 2—2 of Fig. 1, looking down, and showing also the pump and the piping connections between it and the valves.
Figure 3:
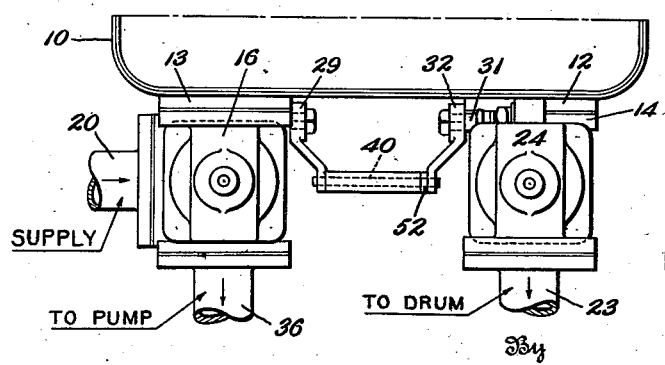
Fig. 3 is an end elevational view of the parts shown in Fig. 1, as seen from the left thereof.

The normal position of the parts is illustrated in full lines in Fig. 2, with all of the valves 15, 17, 22 and 25 closed, and the control lever 45 in its central or neutral position. When it is desired to introduce water into the tank 10 preparatory to supplying a measured quantity to the mixing drum, the lever 45 is swung to the broken line position shown in said figure, which movement, through leg 50, links 51 and 52, valve actuating arms 29 and 32, valve stems 28 and 31, and operating levers 27 and 33, opens the valves 15 and 22 simultaneously. Water from the supply line 20 may thus pass through valve chamber 21, port 35 and pipe 36 to the pump 37, which will force it through pipe 38, port 39, valve chamber 14 and connection 12 into the tank 10. The tank may be partially or completely filled, as desired, whereupon the control lever 45 is returned to neutral position, permitting the springs to close valves 15 and 22. When it is desired to transfer the water from the tank to the mixing drum, the lever 45 is moved to the dotted line position shown in Fig. 2, which has the effect of simultaneously opening valves 17 and 25. The pump 37 may now draw water from the tank, through valve chamber 16, port 35 and pipe 36, and force it to the mixing drum through pipe 38, port 39, valve chamber 24 and pipe 23. By watching the gauge glass 11 the operator may determine when the desired quantity has been pumped from the tank to the drum and thereupon move the control lever 45 back to neutral, closing valves 17 and 25. Preferably, the tank 10 is never completely discharged, in order that breaking of the prime of the pump 37 may be avoided.

If the pump 37 be constantly operated, as is sometimes the case in apparatus of this character, the said pump may be of the type which includes a by-pass between its discharge and intake, diagrammatically indicated by the pipe 37' in Fig. 2, whereby when all four valves 15, 17, 22 and 25 are closed, the pump merely circulates the water through itself, to prevent stalling. A small by-pass 18 may be provided between the valve housing 16 and conduit 36 through which water may be bled from the tank whereby to prevent overheating of the water in the pump if the latter should be running for any considerable length of time with all of the valves closed.

The control lever 45 is so designed and mounted that when it is moved to either its broken line or its dotted line position, its leg 49 will engage the fixed stop 48, while the pivot 51a between its leg 50 and the link 51 will have moved across the dead center line of the lever-mounting pivot 46 and the link pivot 51b. A toggle lock will thus be effected which will prevent the valve springs from closing the open pair of valves until the lever 45 is moved back toward the neutral position a distance sufficient to move the pivot 51a back across the said dead center line.

While one form of the invention has been illustrated and described, it will be obvious that those skilled in the art may vary the precise details of construction and arrangement of parts without departing from the spirit of the invention, and therefore it is not wished to be limited to the above description, except as may be required by the claim.

What is claimed is:

In a system for supplying water in measured quantities to the mixing chamber of a concrete mixer, comprising a supply conduit, a reservoir having an inlet and an outlet, a pump, and a discharge conduit: a multiple valve device having a valve controlling said supply conduit and a valve controlling said reservoir outlet, each of said valves being normally closed and arranged to remain closed when the other is open; liquid conducting connections between said multiple valve device and the intake of said pump; a second multiple valve device having a valve controlling the reservoir inlet and a valve controlling said discharge conduit, each of said valves being normally closed and arranged to remain closed when the other is open; liquid conducting connections between said second multiple valve device and the discharge of the pump; and means for actuating said valves in alternative sets comprising one valve of each device, whereby to (1) simultaneously open the valves controlling the supply conduit and reservoir inlet whereby the pump may transfer water from the supply conduit to the reservoir, the other set of valves remaining closed to prevent by-passing of the water to the discharge conduit, (2) simultaneously close such opened valves, (3) simultaneously open the reservoir outlet and discharge conduit valves whereby the pump may transfer water from the reservoir to the discharge conduit, the first set of valves remaining closed to prevent by-passing of the water from the supply to the reservoir and discharge conduit, and (4) simultaneously close the second set of valves.

LOUIS G. HILKEMEIER.

REFERENCES CITED

The following references are of record in the file of this patent:

UNITED STATES PATENTS

| Number | Name | Date |
| --- | --- | --- |
| 1,522,752 | Shield | Jan. 13, 1925 |
| 830,046 | Bole | Sept. 4, 1906 |
| 675,327 | Felt | May 28, 1901 |
| 1,970,893 | Lennard | Aug. 21, 1934 |
| 1,211,646 | Vincent | Jan. 9, 1917 |